United States Patent [19] [11] 4,219,273
Ikeda [45] Aug. 26, 1980

[54] OPTICAL APPARATUS FOR ELECTROPHOTOGRAPHIC COPYING MACHINE

[75] Inventor: Hiroshi Ikeda, Aichi, Japan

[73] Assignee: Minolta Camera Kabushiki Kaisha, Osaka, Japan

[21] Appl. No.: 28,795

[22] Filed: Apr. 10, 1979

[30] Foreign Application Priority Data

Apr. 15, 1978 [JP] Japan ............................ 53/50113[U]

[51] Int. Cl.[2] ........................ G03B 27/70; G02B 7/11
[52] U.S. Cl. ........................................ 355/60; 350/255
[58] Field of Search .................................. 355/55-60, 355/8, 11, 61-63; 350/187, 255

[56] References Cited

U.S. PATENT DOCUMENTS

| | | | |
|---|---|---|---|
| 3,778,147 | 12/1973 | Reehil et al. | 355/57 X |
| 3,873,189 | 3/1975 | Whitaker et al. | 355/55 X |
| 3,884,574 | 5/1975 | Doi et al. | 355/66 |

*Primary Examiner*—L. T. Hix
*Assistant Examiner*—W. J. Brady
*Attorney, Agent, or Firm*—Wenderoth, Lind & Ponack

[57] ABSTRACT

A lens positioning device for an electrophotographic copying machine having at least three magnification modes and including a projecting lens unit movable along the optical axis between extreme positions representing the largest and smallest magnifications through an intermediate position representing a magnification substantially intermediately between the largest and smallest magnifications. The lens positioning device comprises a stopper mechanism for trapping the projecting lens unit at the intermediate position accurately and exactly. This stopper mechanism includes at least one blocking element pivotally carried by a movable block and operable to halt the movement of the projecting lens unit when the movable block is moved to a position where the blocking element is ready to engage the projecting lens unit.

8 Claims, 8 Drawing Figures

OPTICAL APPARATUS FOR ELECTROPHOTOGRAPHIC COPYING MACHINE

BACKGROUND OF THE INVENTION

The present invention generally relates to an optical apparatus for an electrophotographic copying machine having a plurality of magnification modes and, particularly, to a positioning device for retaining a projecting lens assembly exactly at a predetermined position appropriate to a particular magnification mode. More particularly, the present invention pertains to an optical apparatus having three or more magnification modes including a mode wherein the magnification is 1, that is, the life size reproduction mode.

In a prior art electrophotographic copying machine of a slit exposure type, a construction of which is schematically shown in FIG. 1 of the accompanying drawings, an original 2 to be copied, which is placed on a transparent support 1, is illuminated by an illuminating lamp 3 while the latter is moved together with a first reflective mirror 4 from one position shown in solid lines to another position shown in broken lines at a predetermined velocity V to successively scan the original 1 to be copied. Simultaneously with the movement of the illuminating lamp 3 together with the first reflective mirror 4, a second reflective mirror 5 is moved in a direction parallel to the direction of movement of the illuminating lamp 3 from the solid line position to the broken line position at a velocity equal to half the velocity V of movement of the illuminating lamp 3, that is, at a velocity of V/2. An image of the original 1 to be copied is transmitted to a projecting lens assembly 6 by the first reflective mirror 4 and then the second reflective mirror 5 and is subsequently reflected by third and fourth reflective mirrors 7 and 8 and then through an exposure slit 10 onto a photoreceptor surface, for example, a photoconductive outer peripheral surface of a drum 9 being rotated in a direction shown by the arrow at a peripheral velocity Vo past an exposure station.

Prior to the photoreceptor drum 9 being moved past the exposure station, the photoconductive surface of the drum 9 is electrostatically charged at a charging station by a corona charging device 19. The electrostatically charged photoconductive surface of the drum 9 is then exposed at the exposure station to light projected through the exposure slit 10 by the optical system including the projecting lens assembly 6 so that an electrostatic latent image is formed on a local surface area of the photoconductive surface of the drum 9 in a pattern corresponding to the pattern of the image of the original 1 to be copied. The electrostatic latent image is subsequently developed into a powder or toner image by exposing the photoconductive surface of the drum 9 to a developing material supplied at a developing station from a developer unit 11. The toner image can then be transferred from the photoconductive surface of the drum 9 to a sheet of final support material, for example, copying paper, which has been supplied from a paper supply unit 12 in synchronism with the rotation of the photoreceptor drum 9. This transfer of the toner image from the photoconductive surface of the drum 9 to the copying paper at a transfer station is carried out by electrically charging the copying paper by means of a transfer corona charger 14 and placing the copying paper in contact with the photoconductive surface of the drum 9.

After the transfer of the toner image from the photoconductive surface of the drum 9 to the copying paper, the photoconductive surface of the drum 9 is cleaned by a cleaning unit 17 and the residual electrostatic charges on the photoconductive surface of the drum 9 are then erased by exposing it to light from an erasing lamp 18. On the other hand, the copying paper bearing the toner image transferred from the photoreceptor drum 9 in the manner described above is separated from the photoreceptor drum 9 by a separator pawl assembly 16, then passed through a fixing station where the toner particles forming the toner image on the copying paper are fused by heat by a fixing unit 13, and is finally discharged from the copying machine.

All of the construction and the operation of the copying machine shown in FIG. 1 are well known to those skilled in the art.

Assuming that the optical system employed in the coying machine of the construction shown in FIG. 1 has a plurality of, for example, three or more, magnification modes, the first and second reflective mirrors 4 and 5 must be moved at the respective velocities V and V/2 during one of the magnification modes wherein the magnification is 1, that is, during the life size reproduction mode. However, in order to establish another one of the magnification modes, the optical system, particularly, the projecting lens assembly 6 and the third and fourth reflective mirrors 7 and 8 must be repositioned so as to satisfy the following relationships.

$$V_1 \cdot \beta_1 = V_2 \cdot \beta_2 \quad (1)$$

$$l = \{f \cdot (\beta_1 - \beta_2)\}/(\beta_1 \cdot \beta_2) \quad (2)$$

$$\Delta L = f|\{(1+\beta_1)^2/\beta_1\} + \{(1+\beta_2)^2/\beta_2\}| \quad (3)$$

$$d = \frac{\cos \gamma}{2(1 + \sin \gamma)} \cdot \{1 + \tan \gamma \cdot \tan \tfrac{1}{2}(\gamma + \tfrac{\pi}{2})\} \quad (4)$$

wherein l represents the distance of movement of the projecting lens assembly, ΔL represents the amount of change of the conjugate length, f represents the focal length of the projecting lens assembly, $\beta_1$ and $\beta_2$ represent respective magnifications and $V_1$ and $V_2$ represent respective velocities of movement. Also, d represents the distance of displacement third and fourth reflective mirrors 7 and 8 wherein γ in the equation therefor represents half angle of intersection of the optical axis as shown in FIG. 1.

In order to establish a magnification mode other than the life size reproduction mode, a magnification selector switch must be manipulated to reposition the projecting lens assembly and the third and fourth reflective mirrors in such a manner as to satisfy the above described relationships. By way of example, if the projecting lens assembly has a focal length of 280 mm, this projecting lens assembly must be moved to a position spaced about 153 mm from the position for the life size reproduction mode when a reproduction mode wherein the magnification is ×0.647 (It is to be noted that throughout this specification and claims the term "magnification" is taken to cover both positive and negative magnifications. Negative magnifications are, of course, reductions.) is desired to be achieved.

In addition, the smaller the magnification, the more the position of the focal point of the projecting lens assembly is adversely affected by an error in positioning the projecting lens assembly to any one of the lens positions respectively corresponding to the different magnification modes. Conversely, an error in magnification may be large as the magnification becomes 1. By way of example, assuming $\Delta L \leqq 0.1$ m and $\Delta\beta \leqq 0.05$, the error $\Delta a$ in positioning the projecting lens assembly must be within a range of up to about 1.4 mm during the life size reproduction mode, within a range of up to 0.25 mm during the ×0.785 magnification mode, and within a range of up to 0.17 mm during the ×0.647 magnification mode. It will readily be seen that, during the ×0.785 and ×0.647 magnification modes, the projecting lens assembly is required to be repositioned as precisely as possible as compared with the repositioning of the projecting lens assembly at the position corresponding to the life size reproduction mode and also at the position corresponding to the smallest magnification mode. So far as the positioning of the projecting lens assembly to any one of the lens positions respectively corresponding to the smallest and largest magnification modes is involved, no error is likely to occur because the end of the stroke of movement of the projecting lens assembly is defined by a fixed stop.

As a means for retaining the projecting lens assembly at a particular lens position substantially intermediate the opposite extreme positions respectively corresponding to the largest and smallest magnification modes, a detent mechanism has usually been employed heretofore. However, it has been found that in the conventional detent mechanism, a relatively large physical force is required not only for stopping the projecting lens assembly at the particular position, but also to release the projecting lens assembly from the particular position in readiness for the movement towards the next lens position.

Where a stop is utilized as a means effective to halt the projecting lens assembly being moved in one direction, it has been found that, in an electrophotographic copying machine having three or more magnification modes, a relatively complicated mechanism is required to operate the stop depending upon the initial position from which the projecting lens assembly is moved incident to a change of the magnification and this often involves the problem that a relatively long time is required to move the projecting lens assembly.

As a means for stopping the movement of the projecting lens assembly, it is possible to use a brake of a type generally employed in a machine tool. However, this type of brake is generally bulky and expensive and, therefore, when used in an electrophotographic copying machine, it tends to increase the manufacturing cost of the copying machine.

SUMMARY OF THE INVENTION

Accordingly, the present invention has been developed with a view to substantially eliminating the above described disadvantages and inconveniences inherent in the prior art positioning device and has for its essential object to provide an improved positioning device for an electrophotographic copying machine of a type having at least three magnification modes, which is effective to accurately position the projecting lens assembly at at least one position substantially intermediate between the extreme positions respectively corresponding to the largest and smallest magnification modes.

Another important object of the present invention is to provide an improved positioning device of the type referred to above, which is effective to retain the projecting lens assembly at the intermediate position accurately irrespective of the direction in which the projecting lens assembly is moved towards such intermediate position.

A further object of the present invention is to provide an improved positioning device of the type referred to above, which is simple in construction and reliable in performance and, therefore, does not result in an increased size and manufacturing cost of the copying machine in which it is incorporated.

BRIEF DESCRIPTION OF THE DRAWINGS

These and other objects and features of the present invention will become apparent from the following description taken in conjunction with preferred embodiments thereof with reference to the accompanying drawings, in which.

DETAILED DESCRIPTION OF THE INVENTION

Figure 1:
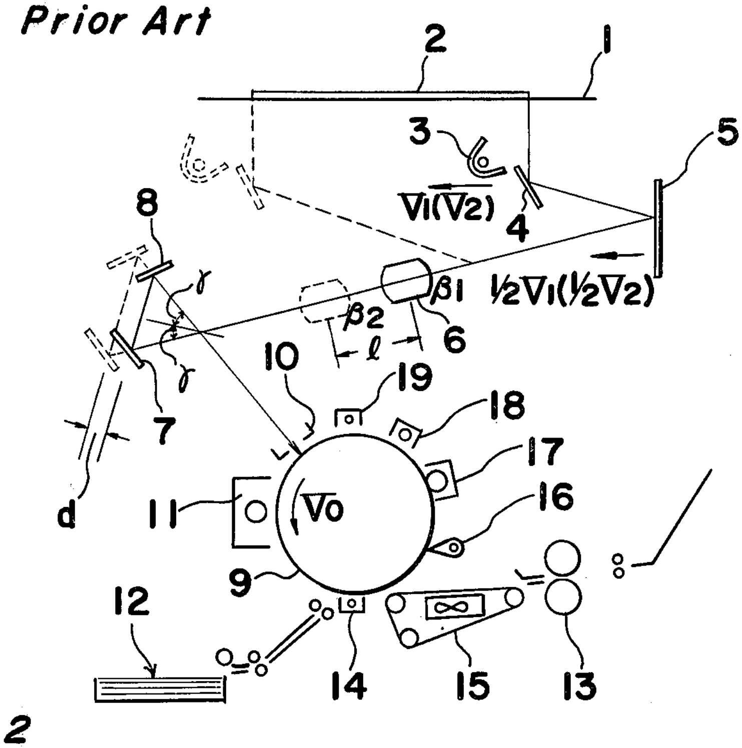
Fig. 1 Prior Art
FIG. 1 is a schematic side view of a prior art electrophotographic copying machine, it being to be understood that the concept of the present invention is applied thereto.

Before the description of the present invention proceeds, it is to be noted that like parts are designated by like reference numerals throughout the accompanying drawings. It is also to be noted that, for the sake of brevity, the present invention will be described as applied to an electrophotographic copying machine having three magnification modes, namely, a largest and smallest magnification modes and a mode substantially intermediate between the largest and smallest magnifications, it being to be understood that the largest magnification is representative of life size reproduction wherein the magnification is ×1.0.

Figure 2:
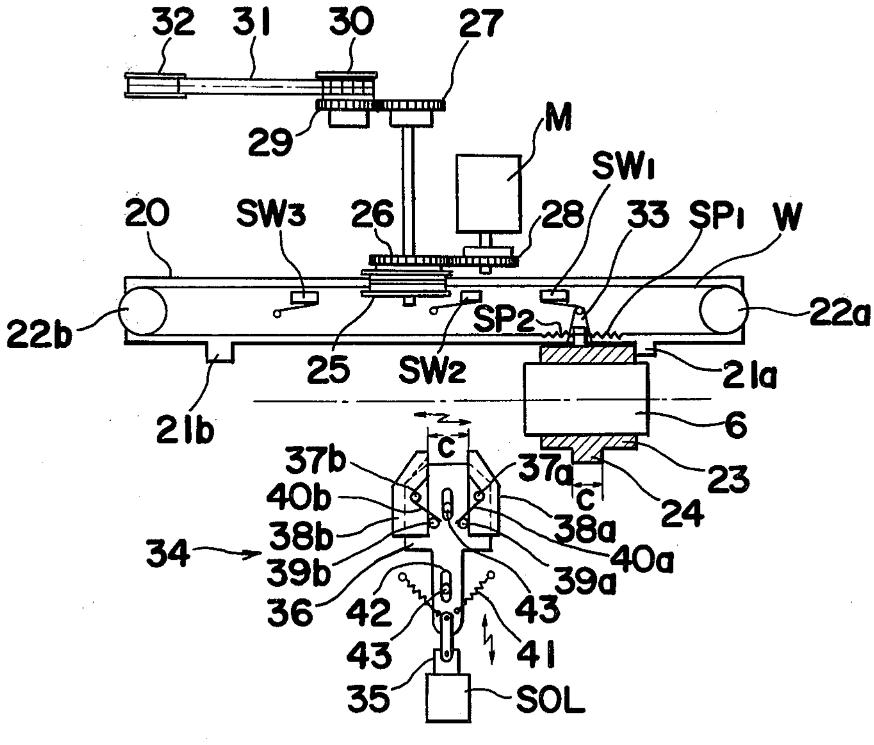
FIG. 2 is a schematic diagram showing a positioning device according to the present invention.

Referring particularly to FIG. 2, the lens positioning device embodying the present invention comprises an elongated side plate 20 having a pair of spaced pulleys 22*a* and 22*b* rotatably mounted on the opposite end portions of said side plate 20. A cable W has its opposite ends secured to a lens carriage 23 through respective tension adjusting springs SP1 and SP2, a substantially intermediate portion of said cable W extending around the pulley 22*a*, then wound in one or two convolutions around a drive pulley 25 coupled to a drive motor M in a manner which will be described later and finally extending around the pulley 22*b* so that rotation of the drive pulley 25 can be transmitted to the cable W to move the lens carriage 23 along a guide structure (not shown) between first and second extreme lens positions respectively representing the largest and smallest magnifications, for example, ×1.0 and ×0.647 magnifications, past a substantially intermediate lens position representing an intermediate magnification, for example, ×0.785 magnification.

The drive pulley 25 is rigidly mounted on a shaft together with a driven gear 26 and a drive gear 27, the driven gear 26 being constantly held in mesh with a drive gear 28 which is rigidly mounted on an output shaft of the drive motor M. The drive gear 27 is in constant meshing relation with a driven gear 29 coaxial with a pulley 30, a substantially endless belt 31 being extending between pulleys 30 and 32 so that, when the motor M is in operation, a mirror carriage (not shown) carrying the third and fourth reflective mirrors 7 and 8 as best shown in FIG. 1 can be moved to any one of several positions respectively corresponding to the first extreme, intermediate and second extreme lens positions of the lens carriage 23 when the copying machine is switched from one magnification mode to another.

The projecting lens assembly 6 is rigidly mounted on the lens carriage 23. This lens carriage 23 has a first block means in the form of a lateral projection 24 and a rigid feeler 33 which are rigidly connected thereto or otherwise integrally formed therewith and which extend outwardly from the carriage 23 in the opposite directions. The rigid feeler 33 on the lens carriage 23 is adapted to open any one of microswitches SW1, SW2 and SW3 stationarily supported on the side plate 20 at respective positions aligned with the first extreme, intermediate and second extreme position of the lens carriage 23, each of said microswitches SW1, SW2 and SW3 being operable to interrupt, when so opened, the supply of an electric power to the drive motor M to halt the lens carriage 23 at the corresponding lens position. In particular, for avoiding an overrun of the lens carriage 23 beyond either of the first and second extreme positions, fixed stop 21*a* and 21*b* are provided separately from, or integrally with, the side plate 20 and at respective positions where the rigid feeler 33 is aligned with the microswitches SW1 and SW2.

The lens positioning device further comprises an intermediate stop mechanism, generally identified by 34, for firmly holding the lens carriage 23 precisely at the intermediate lens position immediately after the lens carriage 23 has been moved thereto from either the first extreme lens position or the second extreme lens position to establish the intermediate magnification mode. This stop mechanism 34 is arranged on one side of the guide rail structure (not shown) for the lens carriage 23 opposite to the microswitch SW2.

The intermediate stop mechanism 34 comprises a solenoid unit SOL adapted to be electrically driven by magnification selector buttons (not shown) and having a solenoid plunger 35 which is movable between retracted and projected positions, but which is normally biased to the projected position by pulling springs 41, said solenoid unit SOL being operable when actuated to move the solenoid plunger 35 from the projected position towards the retracted position.

The stop mechanism 34 further comprises a second block means in the form of a substantially elongated carrier block 36 coupled to the solenoid plunger 35 for movement together with said plunger 35 in a direction perpendicular to the direction of movement of the lens carriage 23, and blocking element means having movable means in the form of a pair of blocking members 38*a* and 38*b* pivotally mounted on the carrier block 36 on respective support pins 37*a* and 37*b*, and fixed means in the form of a pair of positioning pins 39*a* and 39*b* rigidly mounted on the carrier block 36, and a pair of biasing springs 40*a* and 40*b* each being shown in the form of a wire spring. This stop mechanism 34 is so designed that, so long as the lens carriage 23 is held in either one of the first and second extreme lens positions, each of the blocking members 38*a* and 38*b* is held in an engageable position as shown in FIG. 2 by the action of the corresponding biasing spring 40*a* or 40 *b* having one end thereof engaged with the corresponding positioning pin 39*a* or 39*b*. Accordingly, these blocking members 38*a* and 38*b* in their respective engageable positions extend in substantially parallel relation to each other and also to the direction of movement of the carrier block 36. As best shown in FIG. 2, the carrier block 36 is movably supported on a suitable framework (not shown) by means of a pair of mounting pins 43 extending through respective guide slots 42 defined therein.

It is to be noted that, with the blocking members 38*a* and 38*b* this mounted on the carrier block 36, the ends of the respective blocking members 38*a* and 38*b* remote from the associated positioning pins 39*a* and 39*b* are spaced from each other a minimum distance c sufficient to accommodate the lateral projection 24 in the lens carriage 23, said lateral projection 24 having a width equal to the distance c.

The operation of the positioning device thus far described with particular reference to FIG. 2 will now be described with reference to FIGS. 3(*a*) to 3(*d*).

Figure 3A:
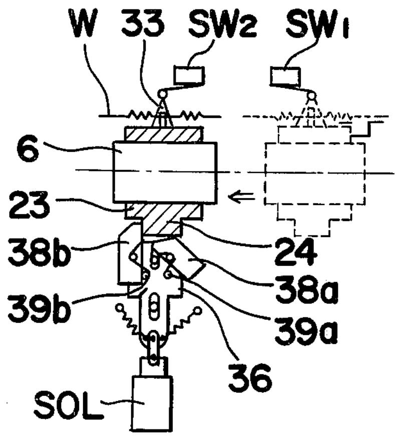
FIGS. 3(*a*) to 3(*d*) are schematic side views showing a stop mechanism according to one preferred embodiment of the present invention in different operative positions.
Figure 3:
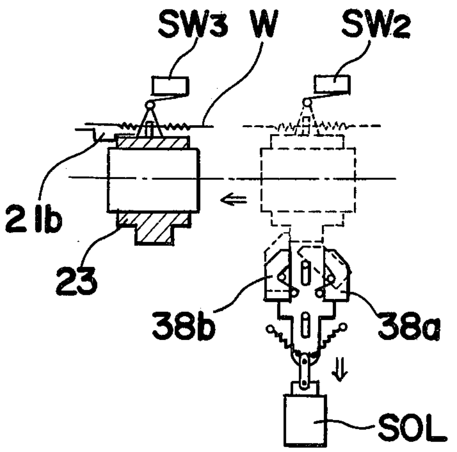
Figure 3C:
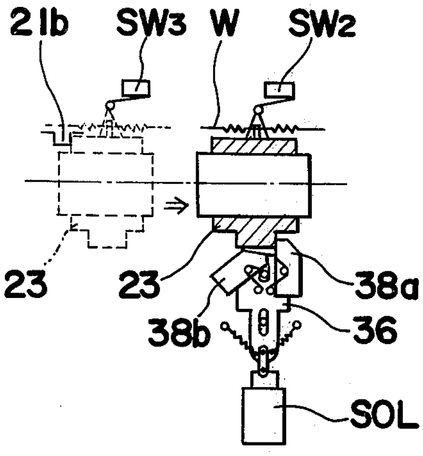
Figure 3D:
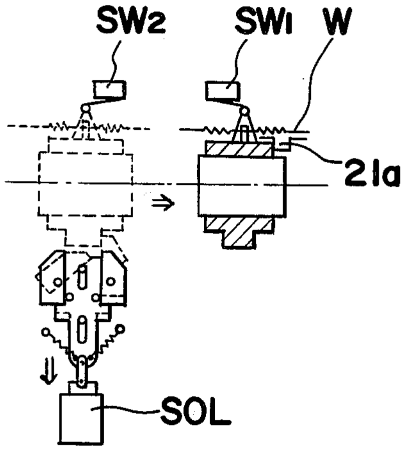

Assuming that the lens carriage 23 having the projecting lens assembly 6 rigidly mounted thereon is held at the first lens position as shown by the broken lines in FIG. 3(*a*), the manipulation of the magnification selector button (not shown) associated with the intermediate magnification mode results in a drive circuit for the drive motor M being switched to drive the drive motor M, whereby the lens carriage 23 is moved in a direction from the first extreme lens position towards the left as viewed in FIG. 3(*a*). During the movement of the lens carriage 23 towards the left, the projection 24 on the lens carriage 23 engages the blocking member 38*a*, thereby causing the latter to pivot counterclockwise from the engageable position about the support pin 37*a* against the biasing spring 40*a* until the projection 24 abuts the blocking member 38*b* in the engageable position as shown in FIG. 3(*a*). Simultaneously with the engagement of the projection 24 the lens carriage 23 with the blocking member 38*b*, the microswitch SW2 is opened by the feeler 33 on the lens carriage 23 to interrupt the supply of the electric power to the drive motor M. In this manner, the lens carriage 23 can be brought to the intermediate lens position.

It is however to be noted that there is the possibility that the lens carriage 23 will tend to move further towards the second extreme lens position, even after the supply of the electric power to the drive motor M has been interrupted, under the influence of the inertia force of the drive motor M. According to the present invention, since the counterclockwise rotation of the blocking member 38*b* does not occur subsequent to the engagement of the projection 24 with the blocking member 38*b* by the reason of the employment of the positioning pin 39*b* which prevents the counterclockwise rotation of the blocking member 38*b* from the engageable position, not only is this possibility advantageously avoided, but also the inertia force of the drive motor M can advantageously be counteracted by the tension adjusting spring SP2 which is then stretched to absorb the inertia force of the drive motor M. Therefore, the lens carriage 23 be firmly held in the intermediate lens position.

If another magnification selector button is manipulated to switch from the intermediate magnification mode to the smallest magnification mode, the drive circuit for the drive motor M is switched to drive the motor M on one hand and to actuate the solenoid unit SOL to move the plunger 35 from the projected position towards the retracted position against the force of the springs 41 on the other hand as shown by the broken lines in FIG. 3(*b*). As the solenoid plunger 35 is moved from the projected position to the retracted position, the blocking member 38*b* which has been held in position to block the movement of the lens carriage 23 as shown in FIG. 3(*a*) is retracted out of the path of travel of the projection 24 on the carriage 23, thereby disengaging from the projection 24 while the blocking member 38*a* which has been rotated counterclockwise as shown in FIG. 3(*a*) is caused to pivot clockwise back to the original engageable position by the action of the biasing spring 40*a*. Accordingly, driven by the drive motor M, the lens carriage 23 moves from the intermediate lens position towards the second extreme lens position.

Upon arrival of the lens carriage 23 at the second extreme lens position where the carriage 23 is engaged with the fixed stop 21*b*, the microswitch SW3 is opened by the feeler 33 to interrupt the supply of the electric power to the drive motor M, whereby the lens carriage 23 is held at the second extreme lens position as shown in FIG. 3(*b*).

Where it is desired to move the lens carriage 23 in the second extreme lens position back to the intermediate lens position as shown in FIG. 3(*c*), what is necessary is to reverse the direction of rotation of the drive motor M. Similarly, where the lens carriage 23 in the intermediate lens position is desired to be moved to the first extreme lens position as shown in FIG. 3(*d*), what is necessary is to actuate the solenoid unit SOL to move the plunger 35 from the projected position towards the retracted position against the springs 41 on one hand and to reverse the direction of rotation of the drive motor M on the other hand.

Figure 4:
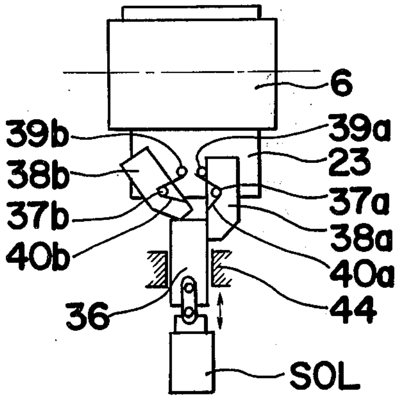
FIG. 4 is a schematic side view showing a stop mechanism according to another preferred embodiment of the present invention.

In the foregoing embodiment, the blocking members 38*a* and 38*b* have been described as being pivotally carried by the second block means in the form of carrier block 36. However, these blocking members 38*a* and 38*b* may be pivotally mounted on the first block means forming part of the lens carriage 23 as shown in FIG. 4 in a substantially similar manner using the support pins 37*a* and 37*b*, the positioning pins 39*a* and 39*b* and the biasing springs 40*a* and 40*b*. In embodiment shown in FIG. 4, the end of the carrier block 36 remote from the solenoid unit SOL must have a width equal to the space between the blocking members 38*a* and 38*b* pivotally carried by the lens carriage 23.

Furthermore, instead of a blocking element means having the employment of the two separate blocking members 38*a* and 38*b* which has been described in connection with the foregoing embodiments, the movable means of the blocking element means can be a single blocking member, which will now be described with particular reference to FIG. 5.

Figure 5:
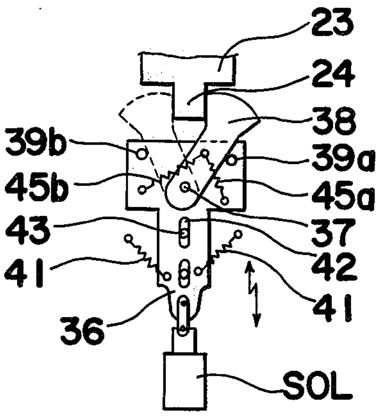
FIG. 5 is a schematic side view showing a stop mechanism according to a further preferred embodiment of the present invention.

Referring now to FIG. 5, a substantially elongated blocking member 38 has one end pivotally mounted on the carrier block 36 by means of a mounting pin 37 for movement between first and second positions. This blocking member 38 is, however, normally biased to a neutral position intermediate between the first and second positions by a pair of biasing springs 45*a* and 45*b*, said blocking member 38 in the neutral position extending in alignment with the longitudinal axis of the carrier block 36 and in parallel relation to the direction of movement of said carrier block 36. The first and second positions of the pivotal movement of the blocking member 38 are respectively defined by stop pins 39*a* and 39*b* rigidly mounted on the carrier block in spaced relation to each other. In the construction shown in FIG. 5, it will readily be seen that, when the lateral projection 24 in the lens carriage 23 engages the other end of the blocking member 38 during the movement of said lens carriage 23 from the first extreme lens position towards the intermediate lens position, the blocking member 38 is pivoted to the second position where it engages the stop pin 39*b* as shown by the broken lines, thereby holding the lens carriage 23 in the intermediate lens position. On the other hand, when the lateral projection 24 engages the other end of the blocking member 38 during the movement of said lens carriage 23 from the second extreme lens position towards the intermediate lens position, the blocking member 38 is pivoted to the first position where it engages the stop pin 39*a* as shown by the solid lines, thereby holding the lens carriage 23 in the intermediate lens position. When it is desired to move the lens carriage 23 either from the first extreme lens position to the second extreme lens position past the intermediate lens position or from the second extreme lens position to the first extreme lens position past the intermediate lens position, the blocking member 38 is held in the neutral position by the action of the biasing springs 45*a* and 45*b* and the solenoid plunger 35 is held in the retracted position so that the blocking member 38 does not engage the lateral projection 24.

It is to be noted that the switching of the drive circuit for the drive motor M and the switching on and off of the solenoid unit SOL can obviously be accomplished by utilizing a sequence circuit well known to those skilled in the art.

Although the present invention has fully been described in connection with the preferred embodiments thereof with reference to the accompanying drawings, it is to be noted that various changes and modifications will be apparent to those skilled in the art. By way of example, it is possible to movably mount the blocking member on the carrier block for linear movement in a direction parallel to the direction of movement of the lens carriage between a first position, in which the blocking member serves to stop the lens carriage being moved from the first extreme lens position, and a second position in which the blocking member serves to stop the lens carriage being moved from the second extreme lens position. Moreover, the blocking member 38 which has been described as pivotally carried by the carrier block 36 with reference to FIG. 5 and its associated parts may be mounted on the lens carriage 23 in accordance with the teachings of FIG. 4 relative to the embodiment shown in FIGS. 2 and 3.

Accordingly, such changes and modifications are to be understood as being included within the true scope of the present invention unless they depart therefrom.

I claim:

1. In an optical apparatus for an electrophotographic copying machine having at least first, second and third magnification modes, said optical apparatus including a projecting lens assembly for projecting an image of an original to be reproduced onto a photoreceptor at first, a second and third magnifications, a lens positioning device which comprises, in combination:

a lens carriage for supporting said projecting lens assembly and having a first block means thereon and being movable along a path of movement between first and third lens positions through a second lens position located substantially intermediate between the first and third lens positions in a direction parallel to the optical axis of the projecting lens assembly, said first, second and third lens positions being for the first, second and third magnifications, respectively, and corresponding to the respective first, second and third magnification modes;

a first driving means connected to said lens carriage for driving said lens carriage between the first and third lens positions through the second lens position;

separate means for defining the respective first and third lens positions;

a second block means disposed in alignment with the second lens position, one of said block means being fixed and the other being supported for movement between an engaged position toward said path and a disengaged position which is retracted from said path in a direction perpendicular to the direction of movement of the lens carriage;

a second driving means connected to the movable one of said block means for driving said movable block means between the engaged and disengaged positions and adapted to be brought into operation to drive the movable block means from the disengaged position to the engaged position only when the copying machine is to be set in the second magnification mode; and blocking element means on one of said block means and cooperable with the other block means when the movable one of said block means is in the engaged position for blocking movement of said lens carriage when said lens carriage is moved to the second lens position, said blocking element means including movable and fixed means for being engaged by the other of said block means for positioning the lens carriage with said projecting lens precisely at the second lens position whether said lens carriage approaches said second lens position from the direction of said first lens position or from said third lens position.

2. A device as claimed in claim 1 wherein the movable means of said blocking element means comprises a blocking element pivotally mounted on one block member for angular movement between a first emgagement position in which said blocking element is engaged with the other block means to position said lens carriage precisely at the second lens position when said lens carriage approaches said second lens position from the direction of the first lens position and a second engagement position in which said blocking element is engaged with the other block means to position said lens carriage precisely at the second lens position from the direction of the third lens position, and the fixed means of said blocking element means comprises a pair of stop pins on the one block member and abutted by said blocking element at the respective first and second engagement positions for stopping the angular movement of said blocking element past said engagement positions, and said blocking element means further comprising a biasing means connected to said blocking element for biasing the blocking element to a neutral position intermediate the first and second engagement positions.

3. A device as claimed in claim 2 in which said blocking element is mounted on said second block means and said second block means is the movable block means.

4. A device as claimed in claim 2 wherein the biasing means is constituted by a pair of tension springs each having the opposite ends thereof connected to the blocking element and the one block, respectively.

5. A device as claimed in claim 1 wherein the movable means of said blocking element means comprises a first blocking element pivotally mounted on one block member for angular movement between a first engagement position in which said first blocking element is engaged with the other block means to position said lens carriage precisely at the second lens position when said lens carriage approaches said second lens position from the direction of the first lens position and a passing position in which said first blocking element is in a position to allow the other block means to pass said blocking element means, and a second blocking element pivotally mounted on the one block member for angular movement between a second engagement position in which said second blocking element is engaged with the other block means to position said lens carriage precisely at the second lens position when said lens carriage approaches said second lens position from the direction of said third lens position and a passing position in which said second blocking element is in a position to allow the other block means to pass said blocking element means, and the fixed means of said blocking element means comprises a pair of stop pins on the one block member and abutted by the respective blocking elements at the respective first and second engagement positions for stopping the angular movement of said blocking elements past said engagement positions, and said blocking element means further comprising a biasing means engaged with each of said blocking elements for biasing the blocking elements toward said first and second engagement positions.

6. A device as claimed in claim 5 in which said blocking elements are mounted on said second block means and said second block means is the movable block means.

7. A device as claimed in claim 5 in which said blocking elements are on said first block means and said second block means is the movable block means.

8. In an optical apparatus for an electrophotographic copying machine capable of producing copies at at least three different magnification modes, said optical apparatus including a projecting lens assembly for projecting an image of an original, the combination comprising:

a lens carriage for supporting the projecting lens assembly;

means for moving said lens carriage to one of at least three different positions corresponding to a selected magnification mode, said positions being different for each magnification mode and one of said positions being intermediate of other positions;

a lens positioning means at said intermediate position and movable into and out of the path of movement of said lens carriage for stopping said lens carriage at said intermediate position; and a stop means provided on one of said lens carriage or said lens positioning means and having means pivotable at least in one direction when engaged by the other of said lens carriage or said positioning means for precisely positioning said lens carriage at said intermediate position regardless of the direction from which said lens cariage approaches said intermediate position.

* * * * *